United States Patent Office 3,282,179
Patented Nov. 1, 1966

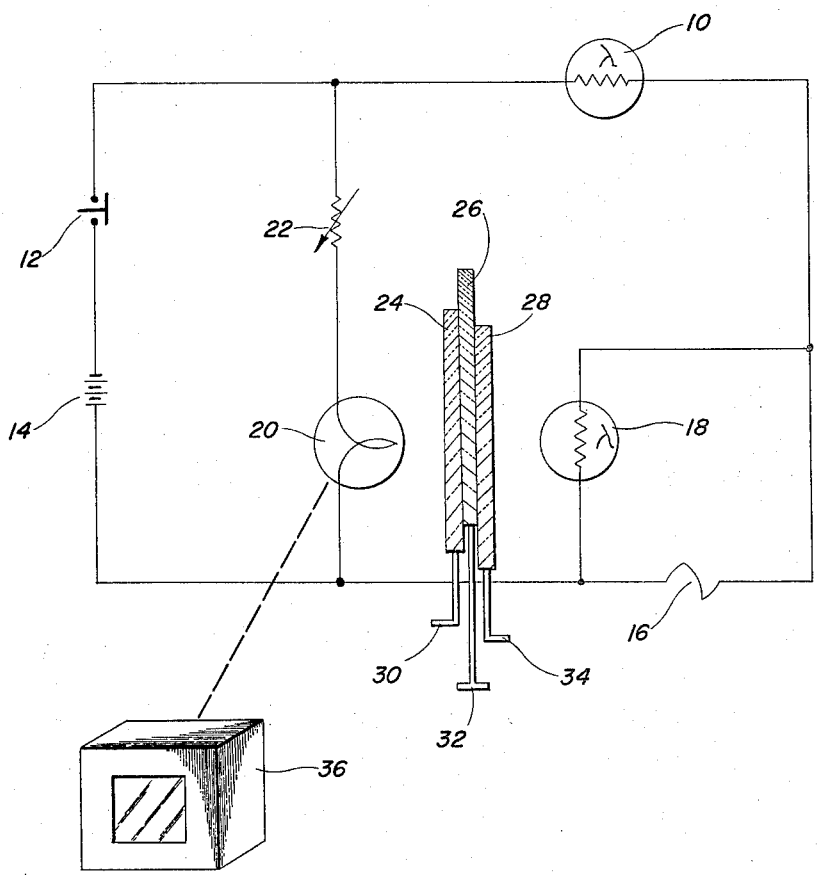
ALLEN G. STIMSON
INVENTOR.
BY
ATTORNEYS

3,282,179
USE OF PHOTOCONDUCTIVE CELL AS ATTENUATOR
Allen G. Stimson, Rochester, N.Y., assignor to Eastman Kodak Company, Rochester, N.Y., a corporation of Jersey
Filed May 20, 1964, Ser. No. 368,849
7 Claims. (Cl. 95—10)

The present invention relates to photoelectric circuits for cameras and the like, and more particularly concerns means for adjusting the sensitivity of such circuits.

In the past it has been customary to vary the sensitivity of photoelectric circuits in cameras either by variably masking the cells or by switching resistors into and out of the circuits. The former method is unacceptable when use of the entire cell area is necessary. The latter method requires the use of several resistors and numerous switch contacts in order to provide a variety of sensitivity settings. The very small electrical currents active in such circuits can be changed significantly by the slightest oxidation or dirt on such switch contacts, which are therefore undesirable. Furthermore, both of these methods become difficult and expensive to apply when it is necessary to vary the circuit sensitivity differentially as a function of two or more factors, e.g., film sensitivity and shutter speed.

It is therefore an important object of this invention to vary the sensitivity of a photocell circuit by means that use the entire area of the photocell throughout the sensitivity range, yet avoid the use of switch contacts. This object is achieved by using a photoresistive device in the photocell circuit and variably illuminating that device.

A related object is to vary the illumination of such photoresistive device by means of one or more manually or automatically adjustable filters interposed between the photoresistive device and a source of illumination.

Other objects of the invention will appear from the following description, reference being made to the accompanying schematic drawing of a preferred form of the invention.

Referring to the drawing, a first photoresistive device 10, for example a CdS cell, is connected in series with a switch 12, a battery 14 and an electric measuring instrument 16 for controlling energization of the instrument by battery 14 as a function of the illumination of cell 10 when switch 12 is closed. In a manner well known in the art, instrument 16 can be used to regulate exposure of film in a camera, for example by controlling adjustment of a lens diaphragm and/or a shutter.

A second photoresistive device 18, which also can be a CdS cell, is connected either in series or, as illustrated, in parallel with instrument 16. When the resistance of cell 18 is changed, the sensitivity of the above-described instrument circuit is changed. For this purpose, cell 18 is illuminatable by a lamp 20, which is connected in series with a calibrating resistor 22 across switch 12 and battery 14, so that the lamp is energized when switch 12 is closed.

One or more variable optical attenuators, illustrated as neutral density optical wedges 24, 26 and 28, are interposed between lamp 20 and cell 18 and are mounted for independent movement in a vertical direction, as illustrated in the drawing, to vary the illumination of cell 18. These wedges can be moved manually or automatically as functions of respective exposure factors such as film sensitivity, shutter speed and background illumination of the photographic subject. Means for moving devices such as wedges 24, 26 and 28 relative to exposure factor scales, either manually or automatically, for example under control of a film cartridge inserted into a camera, are well known and are illustrated generally at 30, 32 and 34.

If it is desirable that the brightness of lamp 20 be subject to calibration by the camera operator, it can be viewed through a simple comparison or extinction photometer 36 of any well-known type, mounted on the camera, and resistor 22 can be adjusted by the operator for that purpose.

The invention has been described in detail with particular reference to preferred embodiments thereof, but it will be understood that variations and modifications can be effected within the spirit and scope of the invention as described hereinabove and as defined in the appended claims.

I claim:
1. In an apparatus for controlling the exposure of a camera including a photoelectric circuit, an electric measuring instrument, a battery for energizing said instrument, and a first photoresistor illuminatable by scene light and connected in circuit with said battery for controlling energization of said instrument as a function of the illumination of said photoresistor, means for adjusting the sensitivity of said circuit, comprising, in combination: a lamp; means for energizing said lamp; a second photoresistor, illuminatable by said lamp and connected in circuit with said instrument; at least one variable optical attenuator interposed between said lamp and said second photoresistor; and means for varying said optical attenuator in accordance with changes in an exposure factor.

2. The combination defined in claim 1, wherein said lamp-energizing means comprises said battery.

3. The combination defined in claim 1, wherein said attenuator comprises a neutral density optical wedge.

4. The combination defined in claim 1, with means for adjusting the brightness of said lamp.

5. The combination defined in claim 1, with means for calibrating the brightness of said lamp.

6. The combination defined in claim 1, wherein said second photoresistor is connected in parallel with said instrument.

7. In an apparatus for controlling exposure of film in a camera, the combination of an electric measuring instrument, a first photoelectric cell connected in circuit with said instrument, said first photoelectric cell being exposable to scene illumination, a second photoelectric cell connected in circuit with said first cell, and a source of illumination separate from the scene light and positioned for illuminating said second cell, and means for varying the illumination of said second cell by said source.

References Cited by the Examiner
UNITED STATES PATENTS
3,073,220   1/1963   La Rue _____ 95—10

JOHN M. HORAN, Primary Examiner.